United States Patent
Östman et al.

(10) Patent No.: US 7,054,353 B2
(45) Date of Patent: May 30, 2006

(54) RADIO RECEIVER AND CHANNEL ESTIMATOR

(75) Inventors: Thomas Östman, Stockholm (SE); Carola Faronius, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 753 days.

(21) Appl. No.: 09/858,633

(22) Filed: May 17, 2001

(65) Prior Publication Data

US 2001/0046221 A1    Nov. 29, 2001

(30) Foreign Application Priority Data

| May 18, 2000 | (SE) | ................................. 0001867 |
| Sep. 15, 2000 | (SE) | ................................. 0003289 |

(51) Int. Cl.
| H04B 1/69 | (2006.01) |
| H04B 7/216 | (2006.01) |
| H04L 7/00 | (2006.01) |
| G01R 31/08 | (2006.01) |

(52) U.S. Cl. ..................... 375/148; 375/354; 370/342; 370/234

(58) Field of Classification Search ........ 375/130–148; 370/335–342

See application file for complete search history.

(56) References Cited

U.S. PATENT DOCUMENTS

| 5,530,716 | A | * | 6/1996 | Lipa ........................... 370/342 |
| 5,710,768 | A |   | 1/1998 | Ziv et al. |
| 5,793,796 | A | * | 8/1998 | Hulbert et al. .............. 375/150 |
| 6,185,199 | B1 | * | 2/2001 | Zehavi ........................ 370/335 |
| 6,215,762 | B1 | * | 4/2001 | Dent ........................... 370/208 |
| 6,370,397 | B1 | * | 4/2002 | Popovic et al. ............. 455/561 |
| 6,377,615 | B1 | * | 4/2002 | Sourour et al. ............. 375/150 |
| 6,658,046 | B1 | * | 12/2003 | Miura ......................... 375/148 |
| 6,731,622 | B1 | * | 5/2004 | Frank et al. ................ 370/342 |

FOREIGN PATENT DOCUMENTS

| EP | 0952750A2 Y | 10/1999 |
| JP | 11331037 A | 11/1999 |
| WO | WO96/04716 A | 2/1996 |
| WO | WO99/57819 A | 11/1999 |

* cited by examiner

*Primary Examiner*—Chieh M. Fan
*Assistant Examiner*—Cicely Ware
(74) *Attorney, Agent, or Firm*—Roger Burleigh

(57) ABSTRACT

The present invention is related to a Rake receiver (R1) for receiving a radio signal and to a searcher (S8a, S8b) for estimating the delay profile of one or more radio links. The searcher includes means for estimating delay profiles in separate windows. The searcher is arranged for being switched into a single window mode or alternatively into a multiple window mode. In single window mode the delay profiles of separate radio links are estimated in the windows, while in multiple window mode two or more windows are allocated adjacent in time for estimating the delay profile of the same radio link. Thereby, the use of the resources of the searcher can be adapted to the radio environments in which the searcher will be used. The Rake receiver comprises fingers that are grouped into two sets. Within a set of fingers the propagation paths are time aligned. The output from the two set of fingers are time aligned and then combined.

9 Claims, 7 Drawing Sheets

RADIO RECEIVER AND CHANNEL ESTIMATOR

TECHNICAL FIELD OF THE INVENTION

The present invention relates to a radio channel estimator and a radio receiver for a spread spectrum signal sequence.

DESCRIPTION OF RELATED ART

In FIG. 1 is shown a mobile station MS acting as a transmitter and a radio base station BTS acting as a receiver of a radio transmitted data stream. On the radio link the signal sequence is transmitted over various propagation paths P1–P5, one of the paths P1 in this example is a direct wave from the transmitter to the receiver while on the remaining propagation paths the signal wave is reflected by various obstacles OB. In FIG. 1, for the sake of simplicity, just one or two reflections for each wave are shown; however, in practice, multiple reflections are common.

Due to different propagation delays on the various propagation paths P1–P5, the signal sequence sent from the transmitter will be received by the receiver as a number of versions of the original data stream mutually delayed and thus interfering with each other. A big leap in radio transmission technology was the introduction of digital signal processing in the transmitters and receivers that enabled the resolution of various versions of a data stream received over the various propagation paths P1–P5. Thereby, the signal energy from selected ones of the various signal paths can be collected in the receiver. The signal energy received origins from the signal energy transmitted and thereafter split on the various ways and decreased due to propagation losses.

A prerequisite for the resolution of a data stream received over the various propagation paths P1–P5 is that the various propagation path delays are known. In FIG. 2, the channel impulse response CHIR is shown in a diagram of power vs. time. The various power peaks PPK1–PPK5 in the diagram correspond to the different propagation paths P1–P5. The propagation delays $\tau_1$, $\tau_2$, $\tau_3$ are indicated and the mutual differences $\Delta\tau_2$, $\Delta\tau_3$ in propagation delay between the propagation paths are found in the channel impulse response CHIR. A radio receiver comprises a radio channel estimator that estimates the propagation delays of the various propagation paths.

In radio communications systems based on DS-CDMA (Direct Sequence Code Division Multiple Access) technology a radio spectrum band is shared by multiple users on code division basis. By this is meant that each user is given a unique spreading code that identifies a radio communication channel dedicated to the specific user. The spreading code also functions as to broaden the frequency band of the original user data. This implies that the spreading code rate is considerably higher than the user data rate, since frequency bandwidth is proportional to the data rate. FIG. 3a shows the principle of bandspreading the power spectral density of the user data, where the user data power originally is gathered in a narrow user data spectrum band NSB but with the spreading code added to it the power is spread over a wider band SSB.

FIG. 3b shows the principle of multiple access in DS-CDMA technology, where the bandspread signal power of multiple users is transmitted in the same radio frequency band SSB. Radio communication channels RCH of the various users can be resolved in receivers by the unique spreading codes.

FIG. 4 shows some essential parts in a DS-CDMA transmitter. The transmitter is fed by a user data stream UDS on one input and by a pilot data stream PS on another input. A corresponding unique spreading code sequence $PN_P$, $PN_D$ is added to the pilot data stream PS and to the user data stream UDS. Thereby a bandspread pilot data stream PS and a bandspread user data stream UDS are produced. The spread pilot data stream PS is phase shifted 90 degrees and thereafter the bandspreaded pilot data stream and data stream are combined. The data streams are modulated on an analogue radio wave and amplified before transmission. However, modulator, amplifier and antenna etc. are not shown in FIG. 4.

FIG. 5 shows a radio channel estimator S1, hereafter called searcher S1, for estimating the channel impulse response CHIR of FIG. 2. The channel impulse response CHIR is also called the delay profile CHIR. The searcher S1 is also arranged to keep track of changing propagation conditions. However, for reasons that will be described further down in the description, only the propagation delays that fit into a first window WW1 indicated in FIG. 2 will be detected in the searcher. In this example the first three propagation paths P1–P3 are within the first window WW1. The searcher receives on its input the energy of the whole spectrum band concerned SSB. The searcher is arranged to find correlations between the various propagation path delays of pilot spreading code stream $PN_P$ sent from the transmitter and its complex conjugate code stream $PN_P^*$ generated in the receiver. FIG. 9 shows a received signal sequence (r) as well as a period of the conjugate pilot code stream $PN_P^*$ that the searcher S1 operates on. The sequence of the received signal (r) is combined with the complex conjugate code stream $PN_P^*$. The combination is repeated a large number of times and for each combination the spreading code phase is increased. The total numbers of combinations thus corresponds to a certain phase length variation of the conjugate pilot code stream $PN_P^*$. A correlation occurs for some of the combinations, and each correlation corresponds to a propagation path having a propagation delay equal to the delay of the added complex conjugate code $PN_P^*$.

The searcher in FIG. 5 comprises a buffer B51 for buffering the sequence of the received signal(r) to operate on and a code generator CG arranged to produce the complex conjugate code stream $PN_P^*$. It further comprises a delaying means DM5 with an input from the code generator CG and a multiplier M51 with an input from the delaying means DM5 and an input from the buffer B51 for the received sequence of the signal(r). In order to find the power peaks PPK1–PPK3 in the first window WW1, the complex conjugate code stream $PN_P^*$ is combined with the received signal sequence (r) in the multiplier M51 and the combined sequence is fed to a correlation detector CD. This is repeated a number of times with the complex conjugate code stream $PN_P^*$ shifted one bit period for each combination. The code generator CG, the delaying means DM5 and the correlation detector CD are controlled by a processor CPU. The processor CPU controls the delay produced in the delaying means DM5 and the buffer B51 and receives from the correlation detector CD information on when correlation occurs. The processor CPU registers the delays that produce correlation.

When the power peaks PPK1–PPK3 have been detected the searcher S1 monitors the spectrum to track changes in the propagation conditions. To track the power peaks PPK1–PPK3 when the propagation delays vary the first window WW1 is moved in time.

FIG. 6 shows a Rake receiver R1 arranged for separately demodulating the various propagation paths P1–P3 of the spectrum spread user data stream UDS that fit into a first window WW1 indicated in FIG. 2. The Rake receiver R1 comprises a set of fingers f1–f3, each of the fingers f1–f3 for handling one of the propagation paths P1–P3. The Rake receiver R1 also comprises a code generator CG for generating the complex conjugate code stream $PN_D^*$ of the spreading code sequence $PN_D$ used in the transmitter for bandspreading the user data stream UDS. A delaying means DM6 at the output of the code generator CG is arranged to delay the conjugate code stream $PN_D^*$ a length corresponding to the delay at the end of the window WW1.

In each of the fingers f1–f3 the received radio signal streams are delayed for a time that corresponds to the difference in delay $\Delta\tau_1$, $\Delta\tau_2$, $\Delta\tau_3$ between the end of the window WW1 and the actual propagation path P1–P3 handled in the finger f1–f3. Thereby, the bandspread user data stream of the various propagation paths is time aligned.

The delayed conjugate code stream $PN_D^*$ is combined in each finger f1–f3 with the time aligned data streams. The delay applied is selected to correlate the conjugate code stream $PN_D$ with time aligned pilot spreading code $PN_P$, and thereby the user data stream is despread and its energy is regathered in the narrow spectrum band NSB.

In the narrow spectrum band NSB an integrator ITR collects energy over short periods and feeds the collected energy to a demodulator DMD. At its output the demodulator produces a complex value. The real part of the complex value of all fingers f1–f3 are added and, based on this addition, a decoding decision is made on every bit in the user data stream UDS. Such combining before a decision is often referred to as soft combining.

The patent application, EP 0 748 074 A2, discloses a Rake receiver, however, the problem concerned is different to that of the present invention.

The international patent application, WO 99/163677 A1, discloses a searcher unit estimating delay profiles CHIR for different sectors of the cell. The power spectrum is received by a sectorized antenna system and the power received in separate sectors is handled by separate window sets in the searcher.

If the window WW1 was prolonged the last two power peaks of the delay profile CHIR would also be detected. However, this would cost a large computation capacity in the searcher S1 because the length L1 of the window WW1 corresponds to the variation in phase length PHL and thus to the number of combinations of the signal sequence (r) with the delayed conjugate pilot code stream $PN_P^*$.

When designing the base station the first window WW1 length is selected as a trade-off between the demand for low complexity and low processor capacity on one hand and the demand for handling propagation paths with a great variety in propagation delays on the other hand. Normally, the first window WW1 length is selected to be able to cope with the differences in propagation paths delays that occur in average radio environments and somewhat worse environments. However, as the radio base stations BTS are positioned at various sites comprising various radio environments the propagation delays vary greatly. Especially in mountain areas and close to lakes, a line of sight propagation wave P1 and a propagation path P4 reflected over a lake or by a mountain far away have a great difference in propagation delay. However, to be able to resolve these propagation paths with a great variety in delay, radio base stations BTS would have to be implemented with processor capacity and with a complexity that for most sites will not be needed.

SUMMARY OF THE INVENTION

A problem related to a prior art searcher, or a Rake receiver, is how to fulfill the conflicting requirements of low complexity and processor capacity on one hand and ability to detect multipath propagation waves with a wide range in propagation delays on the other hand.

It is an object of the present invention to enable the detection of multipath propagation waves also in cases where the propagation path delays have a great variety, while avoiding unnecessary processor capacity complexity in essential parts of a spread spectrum receiver.

This object is achieved by a radio channel estimator that includes two or more window sets for estimating a radio channel impulse response in a respective window. The window sets are arranged to be alternately allocated to estimate the channel impulse response on separate radio links or on the same radio link and when allocated to the same radio link the windows are arranged to be adjacent in time.

This object is also achieved by a Rake receiver with fingers for detecting the same user data stream received over corresponding propagation paths. The fingers are arranged for being grouped into two or more sets of fingers. The difference in propagation paths delay of the paths that are handled by each set of fingers is compensated at the entrance of each finger and thereby the user data stream of the various paths are time aligned in the fingers of a set. However, there is no time alignment between the two sets of fingers. Each finger produces at its output a demodulated stream of values corresponding to the user data stream. The output value streams of the two sets are time aligned, soft combined and fed to a bit decoder arranged for estimating the original user data stream. The Rake receiver is further specified in claim 5.

An advantage provided by the inventive searcher is that its delay profile resources are flexibly allocated for estimating a long delay profile of just one or a few radio links or, alternatively, the resources are allocated for detecting a short delay profile of two or more radio links. For example, when the searcher is used in a radio environment that produces a great variety in the delay spread of different propagation paths, the searcher is switched into the multiple window mode and two or more windows of the searcher are allocated for detecting the delay profile of one radio link. However, when the searcher is used in a radio environment causing less variety in delay spreads the searcher is switched into the single window mode and the separate window resources of the searcher are allocated to separate radio links, such that the searcher thereby is able to handle more radio links.

An advantage provided by the inventive Rake receiver is that less capacity is needed in the beginning of the fingers for buffering of the input signal sequence because time alignment of various propagation paths need only to be made with respect to the fingers of the same set. The value streams at the output of the fingers are time aligned before being fed to the bit decoder. However, these value streams are less complex than the input signal sequence at the fingers and thus need less buffering capacity for the time alignment.

DESCRIPTION OF PREFERRED EMBODIMENTS

Figure 1:
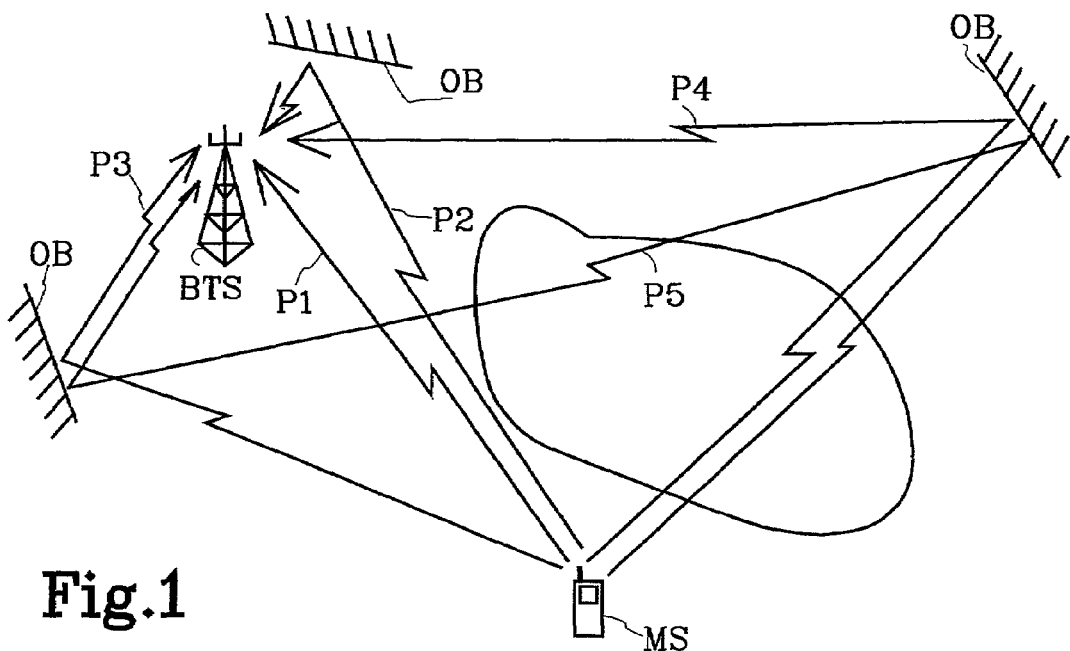
FIG. 1 shows an area view of various wave propagation paths from a transmitter to a receiver.
Figure 2:
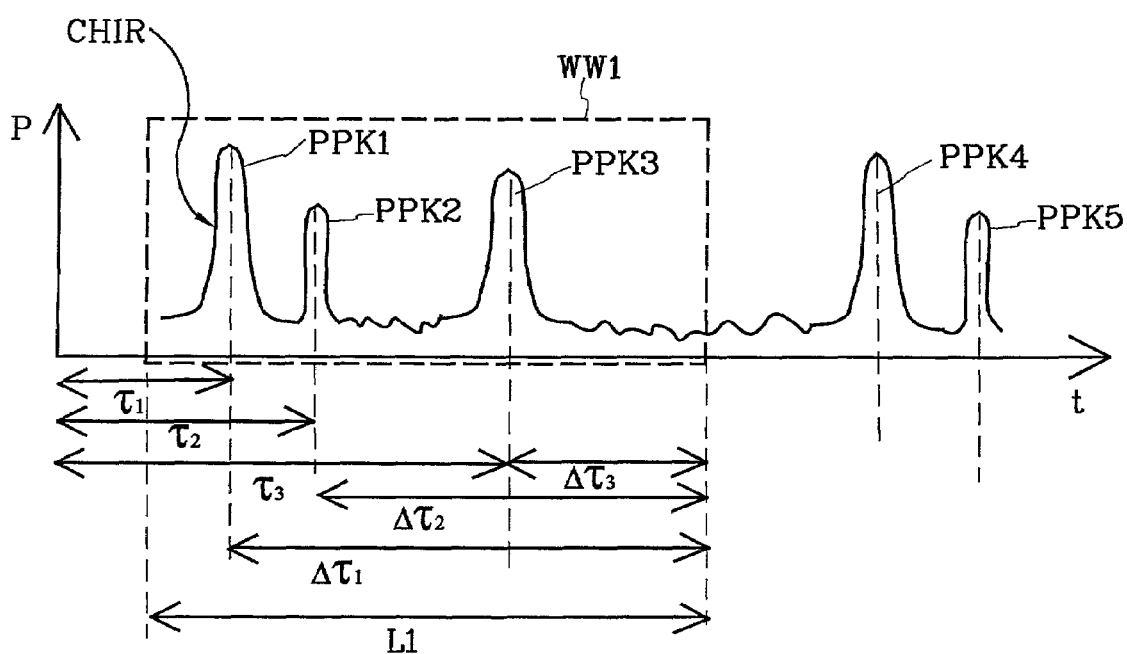
FIG. 2 shows a diagram of the radio channel impulse response showing received power as a function of time.
Figure 3A:
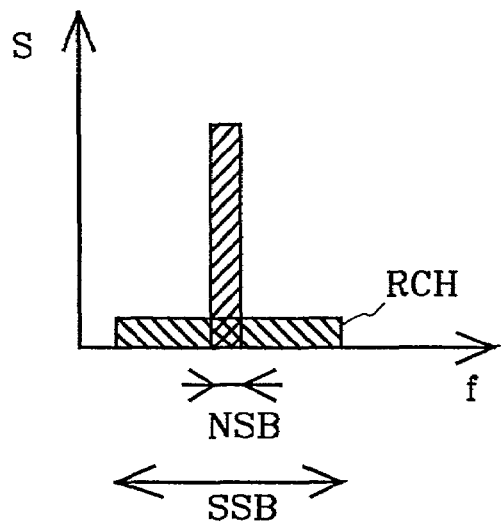
FIG. 3a is a diagram illustrating the principle of frequency bandspreading signal energy that is adopted in DS-CDMA technology.
Figure 3B:
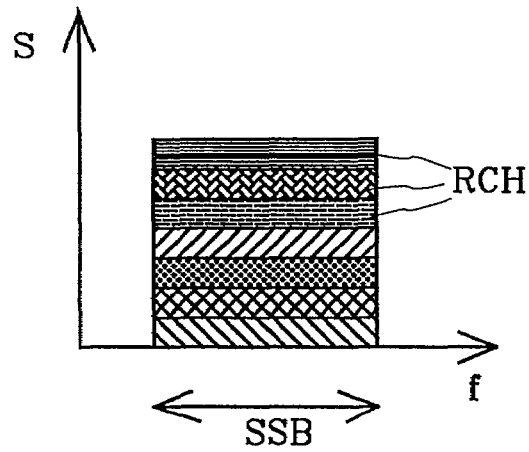
FIG. 3b is a diagram illustrating the multiple access principle of DS-CDMA technology.
Figure 4:
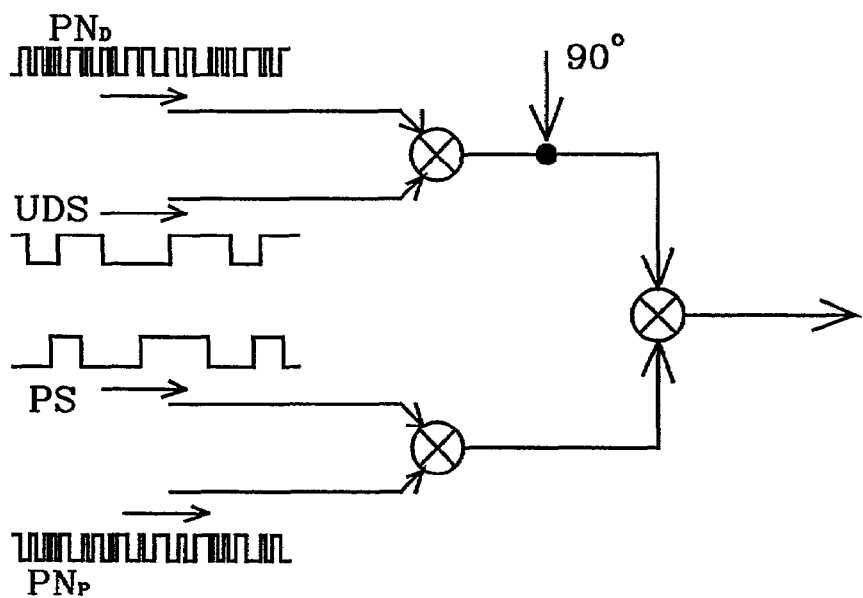
FIG. 4 is a block diagram of some essential parts of a prior art DS-CDMA transmitter.
Figure 7:
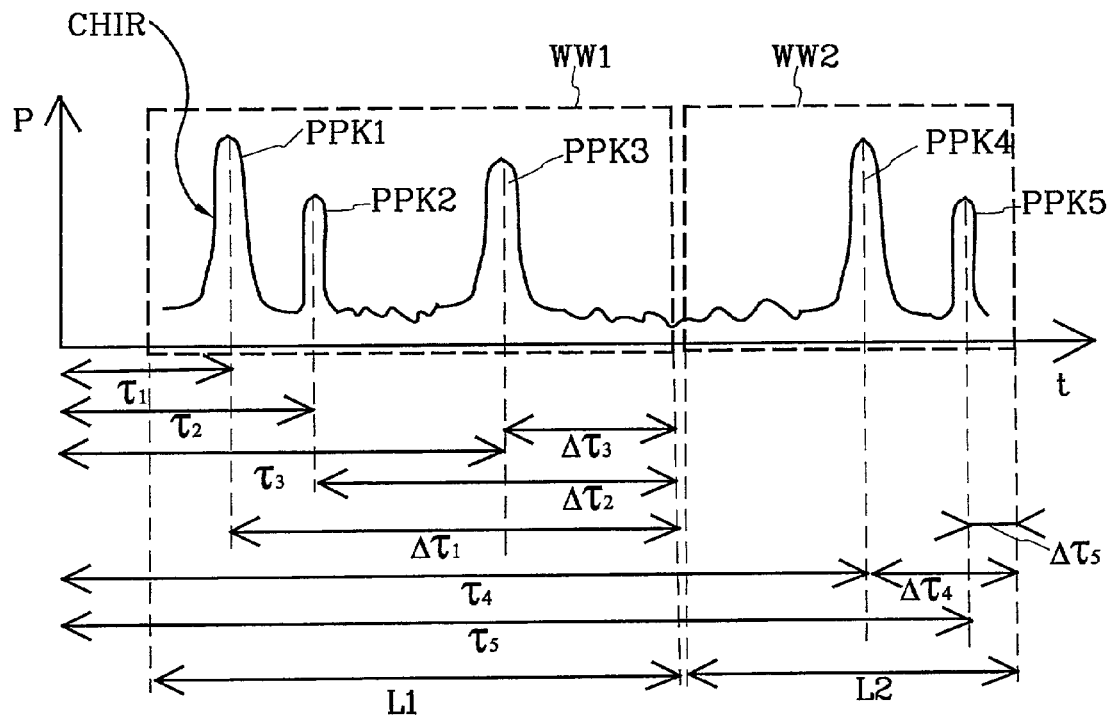
FIG. 7 is a modified version of FIG. 2.

In FIG. 7, the same diagram over the channel impulse response CHIR as in FIG. 2 is shown, i.e. the channel impulse response CHIR for the radio link from the mobile MS to the radio base station BTS in FIG. 1. However, in FIG. 7 a second window WW2 adjacent of the first window WW1 is indicated. The second window WW2 embraces the last two power peaks PPK4–PPK5 of the channel impulse response CHIR.

It is an aim of the present invention to configure a searcher and a Rake receiver with additional means to enable detection of propagation paths P4–P5 that are within the second window WW2.

Figure 5:
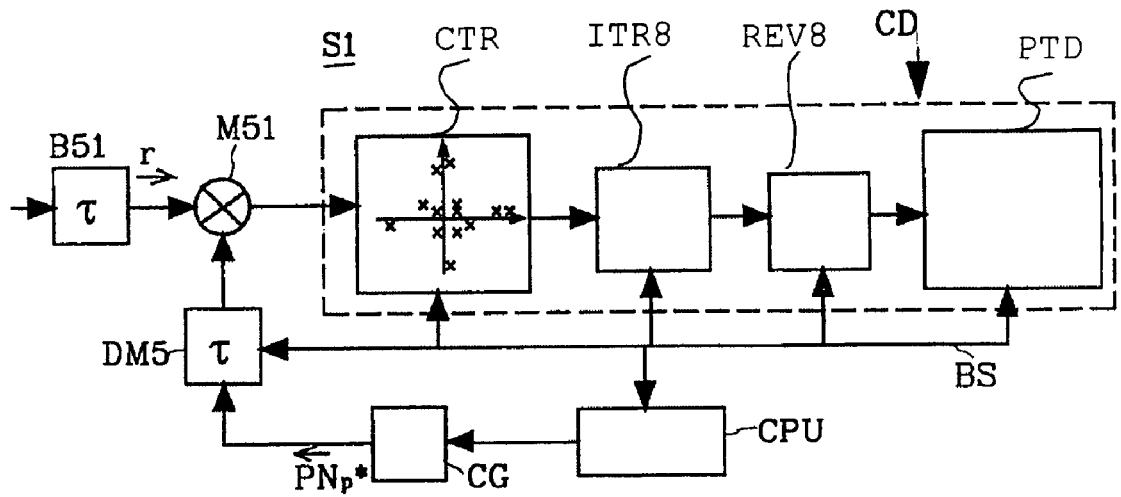
FIG. 5 is a block diagram of a prior art searcher adapted to DS-CDMA technology.
Figure 6:
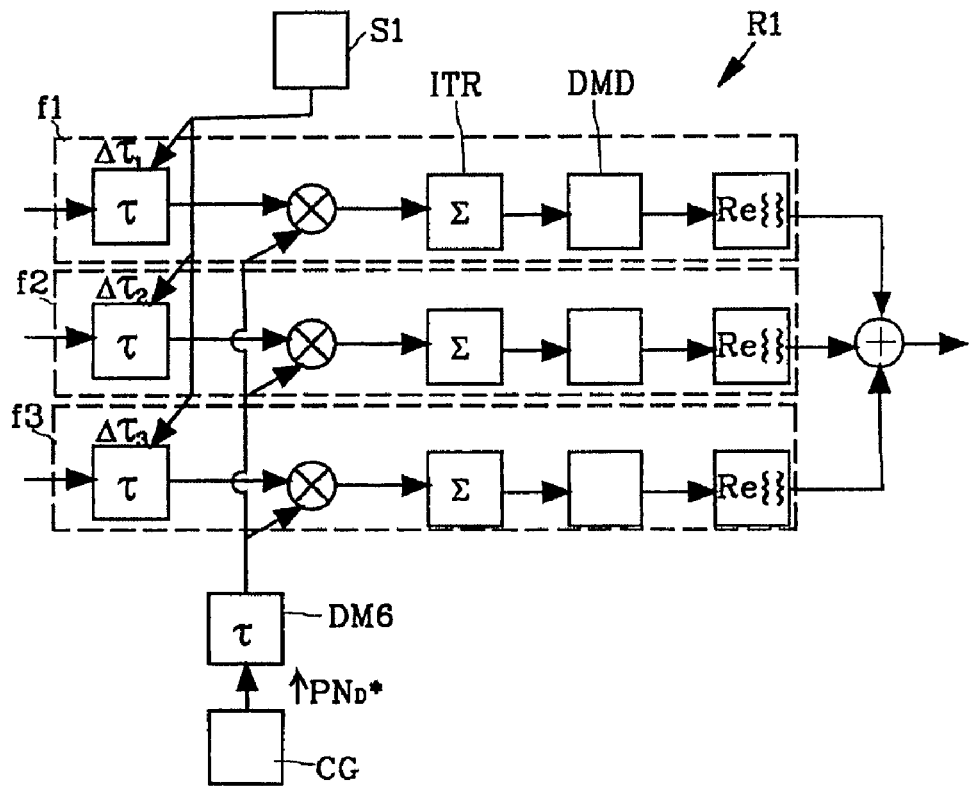
FIG. 6 is a block diagram of a prior art Rake receiver.
Figure 8A:
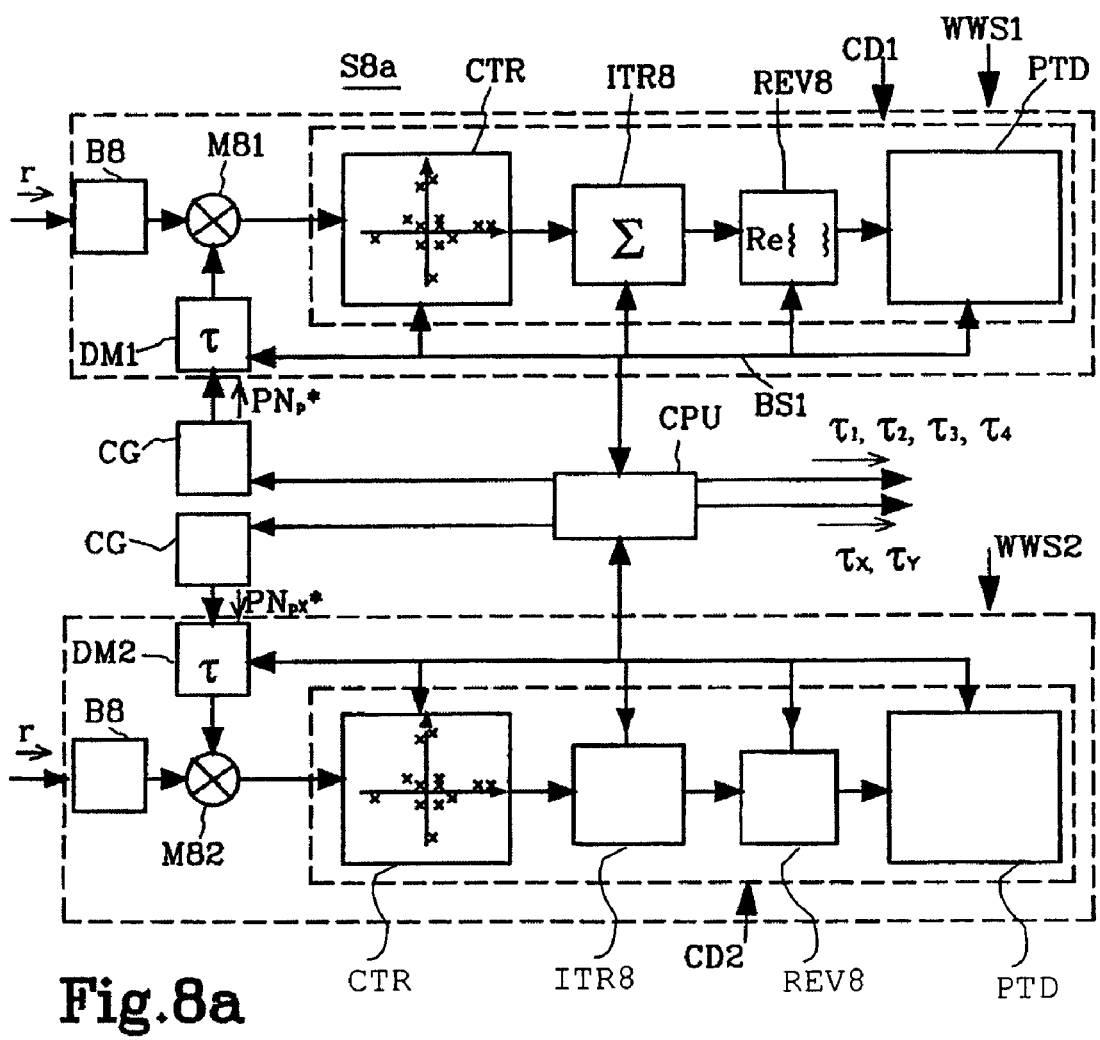
FIG. 8a is a block scheme of a single window mode searcher.

A radio base station BTS Is arranged for handling communication over several radio links, i.e. with several mobile stations MS. FIG. 1 shows by means of example only one mobile station with a radio link, whereby the radio link is represented by its propagation paths P1–P5. If there were more mobile stations MS, radio links established to them would have their own characteristic channel impulse response CHIR. In the following description the term delay profile CHIR will be used instead of channel impulse response CHIR. The radio base station BTS is arranged with a single window mode searcher S8a to enable estimation of several radio channel RCH delay profiles CHIR. FIG. 8a shows the single window mode searcher S8a. The searcher S8a is based on the basic searcher S1 shown In FIG. 5 but has several window sets WWS1, WVVS2 each for handling one radio link. The single window mode searcher S8a is arranged for estimating the delay profile CHIR of a radio link in one corresponding window WW1.

In FIG. 8a just two window sets WW1, WW2 are shown but the searcher S8a can easily be configured with more window sets WWS1, WWS2. Two window sets WWS1, WWS2 enables the detection of the delay profile of two radio links. The window set WWS1, WWS2 includes a buffer B8 for buffering a sequence of the received signal sequence r, a delaying means DM1, DM2 for variously delay a received complex conjugate of the specific spreading code $PN_P^*$ of the pilot data stream of interest. The window set WWS1, WWS2 further includes a multiplier M81, M82 that receives the delayed conjugate code $PN_P^*$ from the delaying means DM1, DM2 and receives from the buffer B8 a sequence of the radio signal r and feeds a correlation detector CD1, CD2, at its output, with the sequence of received spectra multiplied with conjugate pilot code $PN_P^*$.

The searcher S8a also includes a code generator CG for each of the window sets WWS1, WWS2, and a central processor CPU for control of all window sets WWS1, WWS2 and for control of the code generators CG.

A unique pilot spreading code $PN_P$ is allocated to each of the mobile stations MS and serves to identify the respective radio links. The complex conjugate code $PN_P^*$, $PN_{PX}^*$ generated in the code generators of the searcher S8a defines for which of the mobile stations a delay profile will be estimated in the corresponding window set WWS1, WWS2.

Figure 9:
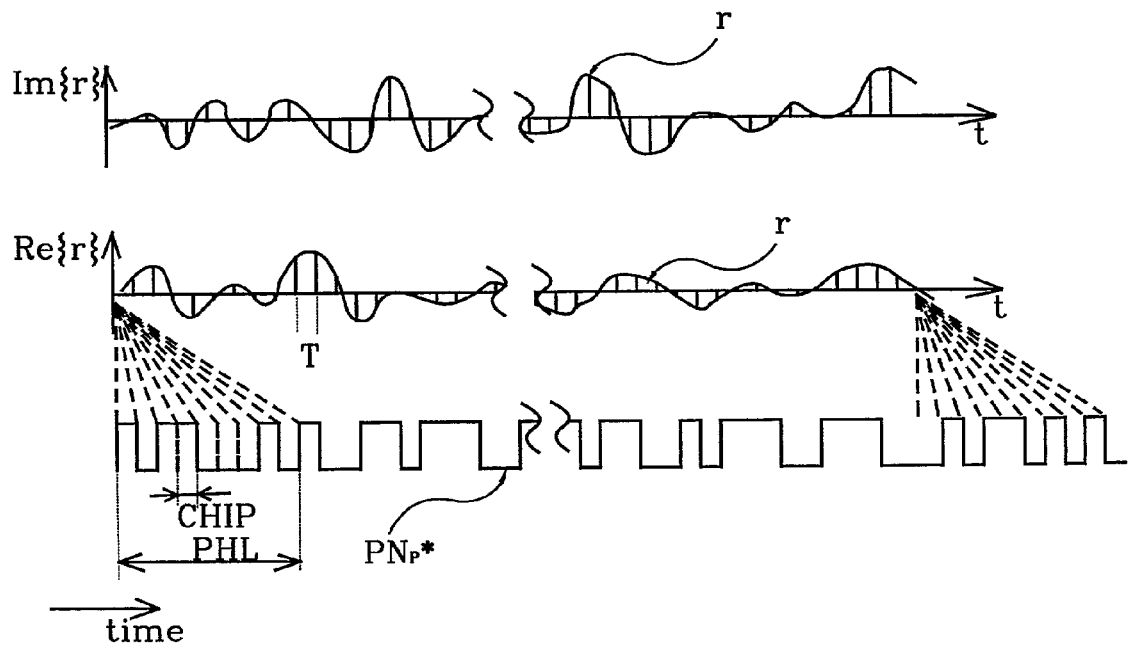
FIG. 9 is an illustration of a frequency spectrum and a digital bit sequence.

FIG. 9 shows a sequence of the radio signal stream r as a function of time, i.e. the radio signal received at the input of the radio base station BTS. In FIG. 9 the physical radio signal is described by a curve of its imaginary Im{r} and real part Re{r} respectively. Before the signal stream r is entered to the searcher S8a it is sampled with an interval T indicated in FIG. 9. FIG. 9 also shows a period of the pilot conjugate code stream $PN_P^*$ and indicates the chip length CHIP.

In the searcher S8a the buffered sequence r of the received signal is multiplied in multiplier M81 with the pilot conjugate code stream $PN_P^*$ generated by code generators CG. However, to enable the delay profile CHIR of the whole window WW1 to be estimated, the conjugate code stream $PN_P^*$ has to be multiplied with the spectrum sequence r for a number of times. At the first multiplication the pilot conjugate code stream $PN_P^*$ is delayed relative to an estimated reference time of the received pilot sequence and thus also with respect to the received signal r. For each further multiplication the phase of the pilot conjugate code stream is incremented one step relative the spectrum sequence r. This shift in the conjugate code $PN_P^*$ phase relative to the spectrum sequence is indicated by dashed lines in FIG. 9. FIG. 9 also indicates the length PHL over which the phase of the pilot conjugate code $PN_P^*$ stream is shifted. This length PHL corresponds to the number of multiplications needed in the searcher S8a and to the window WW1, WW2 length L1, L2.

The central processor CPU controls the delay including phase shift applied to the conjugate pilot code stream $PN_P^*$ and receives from the correlation detector CD the detected energy for each phase shift. The central processor CPU selects which propagation paths P1–P3 are strong enough for tracking and collecting energy from in a Rake receiver of the radio base station BTS. Tracking means that the windows WW1, WW2 position in time is adjusted to embrace the selected power peaks PPK1–PPK3 when the delay profile varies. However, to detect variations in the radio conditions, multiple sequences of the received signal r are estimated in the searcher S8a, and for each spectrum sequence r multiple multiplication with the conjugate code are performed. The start of the window WW1, WW2 is defined by the first delay applied to the conjugate code stream for the first multiplication.

Figure 8B:
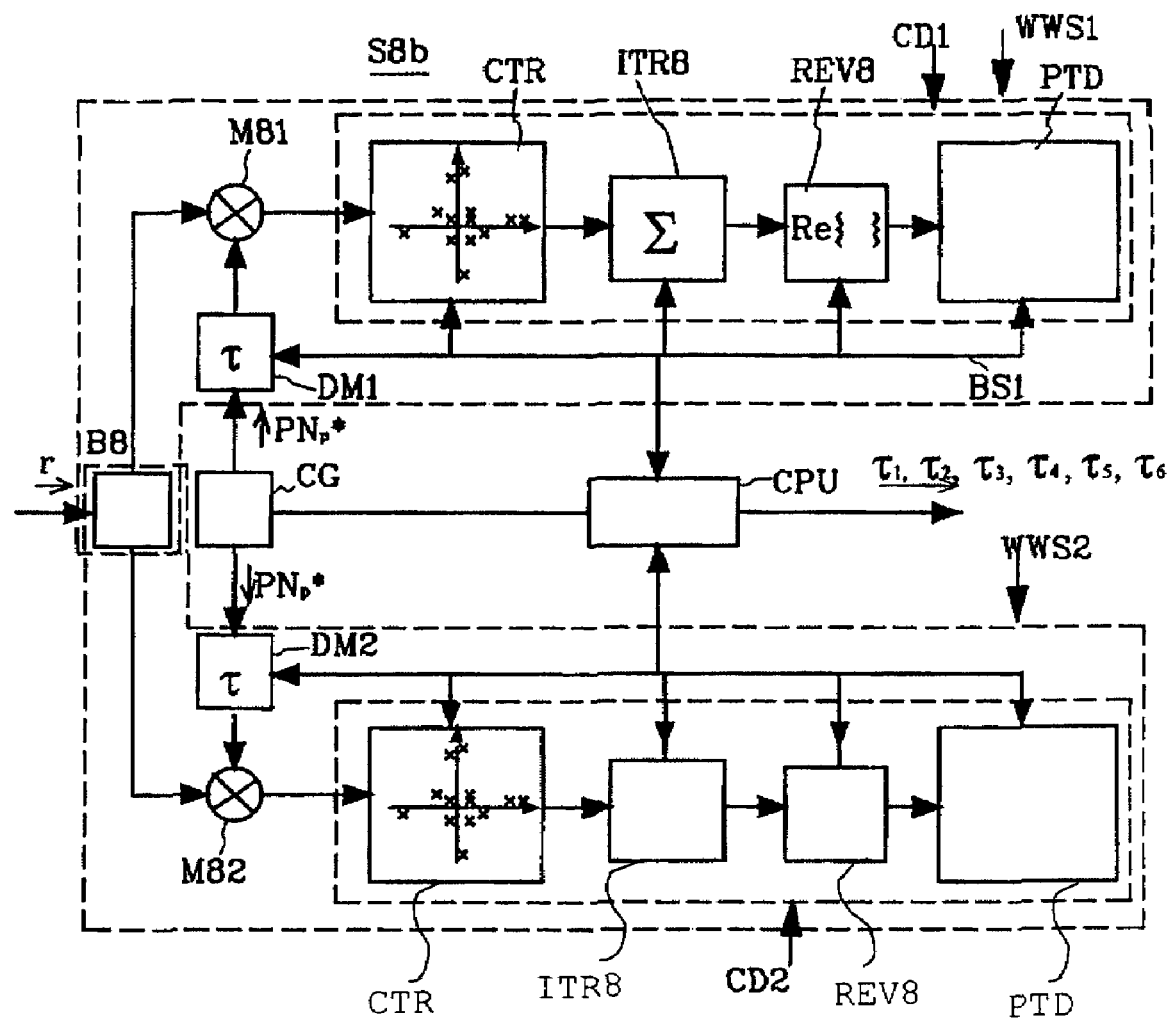
FIG. 8 is a block scheme of a multiple window mode searcher.

The correlation detector CD1, CD2 comprises a correlator CTR that is arranged to correlate with the pilot sequence, a coherent accumulation unit ITR8, a unit REV8 for calculation of absolute values, a non-coherent accumulation unit, and a path detection unit PTD. In FIGS. 8a and 8b the non-coherent accumulation unit is included in the path detection unit PTD.

The coherent accumulation unit ITR8 is intended to increase the signal to noise ratio. To create a power delay profile the absolute square is taken on the values and then non-coherent accumulation is carried out to improve the performance of the path detection unit. The propagation delays detected by the path detection unit PTD are then used by the fingers (f1–f5) in the Rake receiver.

FIG. 8b shows a multiple window mode searcher S8b that corresponds to the single window mode searcher S8a from FIG. 8a but is reconfigured to assign both window sets WWS1, WWS2 to the same radio link. Thereby, the delay profile CHIR of the radio link will be estimated in the two adjacent windows WW1, WW2 as shown in FIG. 7. The two window sets WWS1, WWS2 comprise the same elements notwithstanding whether the searcher S8a, Sb2 is configured as in FIG. 8a or in FIG. 8b. However, in FIG. 8b both window sets WWS1, WWS2 work oh the same sequence of the radio spectrum r and apply the same pilot conjugate code stream $PN_P^*$ to the signal sequence (r) and, therefore, just one buffer B8 and one code generator CG common for both window sets WWS1, WWS2 is needed as shown in FIG. 5b. The code generator CG generates the same pilot conjugate code stream $PN_P^*$ for both window sets WWS1, WWS2. However, the delays applied to the conjugate code $PN_P^*$ by the delaying means DM1, DM2 are defined by the respective window WW1, WW2 position of the window sets WWS1, WWS2.

The two window sets WWS1, WWS2 generate to the central processor CPU the delay profile detected within respective window WW1, WW2. The central processor decides which of the power peaks PPK1–PPK5 are strong enough to collect energy from. The central processor CPU generates on an output the delays $\tau_1$, $\tau_2$, $\tau_3$, $\tau_4$, $\tau_5$ corresponding to the selected power peaks PPK1–PPK5.

In particular, separate buffers B8 and code generators CG can be used for the two window sets WWS1, WWS2, presumed that they are controlled by the central processor CPU to generate the same conjugate code $PN_P^*$ and buffer the same sequence of the signal r.

When the radio base station BTS and its single window mode searcher S8a are designed, the searcher S8a can easily be reconfigured into the multiple window searcher S8b. This implies that switches are provided such that both window sets WWS1, WWS2 are fed with the signal sequence r from a single buffer B8 and fed with the conjugate code stream $PN_P^*$ from a single code generator CG as shown in FIG. 8b. Alternatively, as shown in FIG. 8a, separate buffers B8 and separate code generators CG 8a are used also for the multiple window mode searcher S8b in combination with a program code in the central processor CPU code for controlling the two buffers B8 and the two code generators CG to perform the same instructions in parallel.

When the radio base station BTS is located in a cell of a communication system, where the geographical environments can cause large delay variations, the single window mode searcher S8a is reconfigured into a multiple mode searcher S8b. This is achieved by turning the switches, if provided, or by shifting a program code mode by using parameters that are set via an operator interface of the radio base station BTS.

Alternatively, the central processor CPU is operated by a program code that dynamically shifts the single mode window searcher S8a into multiple window mode searcher S8b and vice versa. During low traffic periods, i.e. when the number of radio links for delay profile estimation CHIR is less then half of the number of window sets WWS1, WWS2 in the searcher S8b the searcher S8b is configured in multiple window mode. When the traffic increases the searcher S8a is set to work in single window mode.

For a searcher S8a, S8b that includes a plurality of window sets WWS1, WWS2 some of the window sets WWS1, WWS2 can work in multiple window mode while other window sets WWS1, WWS2 works in single window mode.

The multiple window mode searcher S8b is configured with more than two window sets WWS1, WWS2 for estimating one delay profile CHIR if requested with respect to the propagation conditions and if there are enough window sets WWS1, WWS2 available.

Figure 10:
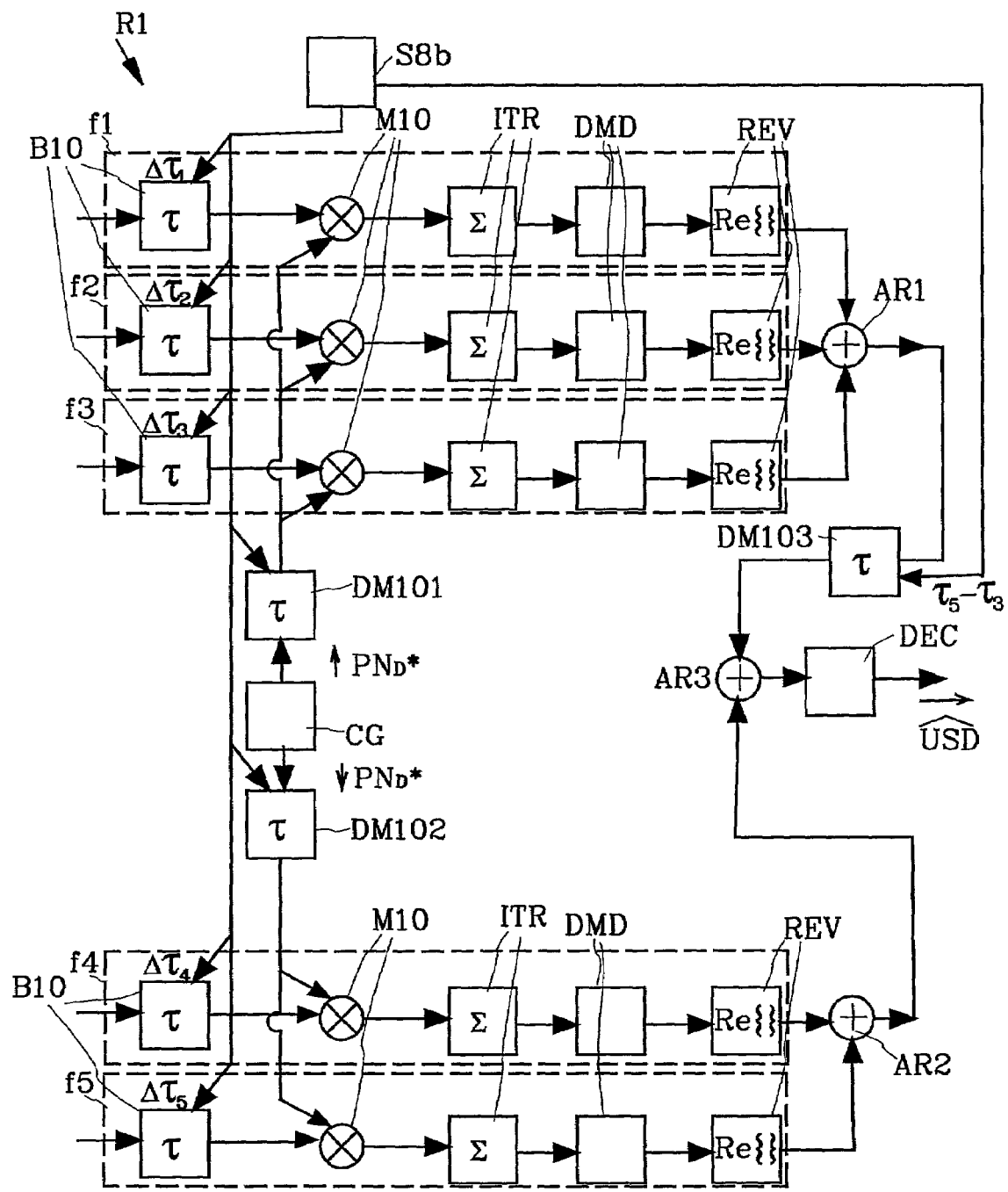
FIG. 10 is a block diagram of an inventive Rake receiver.

In FIG. 10 is shown a Rake receiver R1 including a searcher S8b, fingers f1–f5, a code generator CG, delaying means DM101, DM102, DM103, soft combiners AR1–AR3, and a bit decoder DEC. Each finger f1–f5 is arranged for receiving the wanted user data stream UDS over a corresponding propagation path P1–P5. The fingers f1–f5 are grouped into two sets of fingers. In this example the first set comprises the first three fingers f1–f3 and will handle the first three power peaks PPK1–PPK3 of the delay profile CHIR in FIG. 7. The second set of fingers f4, f5 includes the fourth and fifth finger f4, f5 and will handle the fourth and fifth power peaks PPK4, PPK5.

Each finger f1–f5 includes a buffer B10 that receives and buffers the sampled signal stream r. The buffers B10 are arranged to delay a sequence of the received signal r to compensate for delay variations $\Delta\tau_1$, $\Delta\tau_2$, $\Delta\tau_3$ $\Delta\tau_4$, $\Delta\tau_5$ relative to the delay at the respective window WW1, WW2 end. Thereby, the propagation paths of the wanted user data stream are time aligned within each of the sets of fingers. The buffers B10 receives from the searchers the delays $\Delta\tau_1$, $\Delta\tau_2$, $\Delta\tau_3$ $\Delta\tau_4$, $\Delta\tau_5$ that are applied to the signal sequence r.

The time aligned output signal r from the buffer B10 is in each finger f1–f5 multiplied with a delayed conjugate code stream $PN_D^*$ in a multiplier M10. The conjugate code stream $PN_D^*$ corresponds to the code stream $PN_D$ used for bandspreading the user data stream UDS before transmission and the code stream $PN_D^*$ distinguishes the radio channel RCH from other radio channels RCH. The delay applied to the conjugate code stream $PN_D^*$ before the multiplication corresponds to the delay at the end of the respective window WW1, WW2 and is received by the delaying means DM101, DM102 from the searcher.

Thereby a despread frequency spectrum of the original non-spread user data stream is produced at the output of each multiplier M10. The energy in the despread spectrum band NSB is collected in a following integrator ITR. The collected energy is fed to a demodulator DMD following. The demodulator DMD demodulates the non spread data stream and produces a stream of complex values to a value transformation unit REV arranged to transform the stream of complex values to a stream of real values. The output of the value transformation unit REV is also the output of the finger f1–f5 and on this output is thus generated a stream of real values. The soft combiners AR1, AR2 combine the streams of real values produced in respective set of fingers f1–f3, f4, f5. Since the propagation paths in respective set the fingers were time aligned by the buffers at beginning of the fingers f1–f5, the output real value streams of each set of fingers are correlated. However, the two soft combined output streams from respective set of fingers are uncorrelated. The third delaying means DM103 delays one of the combined real value streams to compensate for the difference in delay; thereby the two streams are correlated and thereafter combined in a third soft combiner AR3 and fed to a bit decoder DEC.

The bit decoder DEC is arranged to make estimation on the original user data stream in the transmitter based on the input stream of real values. The bit decoder DEC generates on its output the estimated user data stream UDS.

An advantage with the Rake receiver R1 of FIG. 10 is that time alignment at the beginning of the fingers need only be done with respect to the fingers of the set. Thereby the buffers B10 do not have to be as long and complex as in case where all the fingers f1–f5, i.e. both sets of fingers, had to be time aligned to each other. Instead, the output real value streams of the two set of fingers have to be time aligned before being combined. The real value output streams needs less buffering capacity than the sampled signal sequence r at the input of the fingers f1–f5. Thereby the Rake receiver R1 is less complex than a prior art Rake receiver.

In the example the fingers f1–f3 of the first set handles the propagation paths P1–P3 that are detected within the first window WW1 and the first window set WWS1 of the multiple window mode searcher S8b, while the second set of fingers f4, f5 handles the propagation paths detected within the second window WW2 and corresponding second window set WWS2 of the searcher S8b. However, the Rake receiver R1 could alternatively be arranged with a prior art searcher S1 instead of the multiple window searcher S8b.

The inventive Rake receiver R1 can be arranged to assign an additional finger f2–f5 for receiving a propagation path whose power peak has arised over a certain value. Accordingly, a finger f1–f5 can also be released from a set arranged for receiving the user data stream if the corresponding power peak PPK1–PPK5 has decreased under a certain level. The Rake receiver can of cause be arranged with more than two sets of fingers f1–f5.

The searcher S8a, S8b as described with reference to FIGS. 8a and 8b has separate physical entities named window sets WWS1, WWS2 each arranged to handle a corresponding window. Alternatively, one physical entity can be arranged to handle several windows WW1, WW2 on time multiplex basis, i.e. its resources is divided in time and used for estimating the delay profile in separate windows WW1, WW2. One such common resource entity comprises the same parts connected as in any of the window sets WWS1, WWS2 that FIGS. 8a and 8b shows. However, a difference is that the central processor controls the entity to work on time multiplex basis. Because the common resource entity has ability to estimate the delay profile CHIR in several windows WW1, WW2 the single entity is considered to comprise several window sets. These window sets of the one entity can be allocated to the same or to several radio links for estimating the delay spread CHIR.

What is claimed is:

1. A radio channel estimator including two or more window sets for estimating a radio channel impulse response in a respective window, characterized in that,
    said window sets are arranged to be alternately allocated to estimate the channel impulse response on separate radio links or on the same radio link and when allocated to the same radio link the windows are arranged to be adjacent in time;
    wherein the radio links are distinguishable by respective spreading codes, and the radio channel estimator further includes:
    code generating means for generating to the window sets the conjugate code streams of said spreading codes; and,
    control means for controlling the code generating means to generate a selected conjugate code stream to respective window set and for controlling the position in time of the windows.

2. The radio channel estimator claimed in claim 1 arranged for use in a code division spread spectrum system.

3. A radio channel estimator as claimed in claim 1 wherein the code generating means are controlled to generate the same conjugate code stream to the two or more window sets when allocated to the same radio link and controlled to generate separate conjugate code streams when the two or more window sets are allocated to separate radio links.

4. A radio channel estimator including two or more window sets for estimating a radio channel impulse response in a respective window, characterized in that,
    said window sets are arranged to be alternately allocated to estimate the channel impulse response on separate radio links or on the same radio link and when allocated to the same radio link the windows are arranged to be adjacent in time, wherein each of the window sets includes,
    a buffer for buffering a sequence of a received signal (r),
    delaying means for variously delaying the conjugate code stream received from a code generator,
    a multiplier for multiplying the delayed conjugate code stream from the delaying means with the buffered sequence of the received signal (r) and thereby producing a product sequence,
    correlation detection means for estimating the channel impulse response within the window by means of detecting the power for each of a number of product sequences wherein the delay of the conjugate code stream is increased for each of the product sequences and the delay variation over all the product sequences corresponds to the length of the window.

5. A Rake receiver including a number of fingers each for receiving a signal stream over a radio channel propagated over a corresponding propagation path, characterized in that,
    the fingers are arranged in two or more sets each for handling the propagation paths that occurs in a corresponding window, and within each of the sets the fingers are arranged to time align the signal stream by compensating for differences in propagation delays of propagation paths within the window,
    buffering means arranged to time align the signal stream from the two or more sets of fingers by compensating for differences in delay between the sets of fingers,
    combiner means with an input from the buffering means for combining the time aligned signal stream from all sets of fingers, and
    decoding means for decoding the signal stream based on the combined time aligned signal stream;
    wherein the signal stream is spectrum spread by a code stream before being transmitted and the Rake receiver further includes,
    a channel estimator for detecting propagation delays of the various propagation paths,
    a code generator for generating a complex conjugate code stream of the code stream used for bandspreading the signal stream before transmission,
    means for correlating the complex conjugate code stream with the time aligned signal stream in the sets of fingers, to form a correlated signal stream and
    means for soft combining the correlated signal stream from the sets of fingers and feed the combination to the decoding means.

6. A Rake receiver as claimed in claim 5 wherein the fingers include,
    a buffer for delaying the received signal stream to compensate for variations in propagation delays of propagation paths handled by the set of fingers and thereby time align the signal stream,
    means for multiplying the signal stream with the complex conjugate code stream of the spreading code stream and thereby produce a despread signal stream, and
    means for demodulating the despread signal stream and thereby produce a demodulated signal stream at the output of the fingers.

7. A Rake receiver as claimed in claim 5 and comprising a radio channel estimator including two or more window sets for estimating a radio channel impulse response in a respective window, characterized in that, said window sets are arranged to be alternately allocated to estimate the channel impulse response on separate radio links or on the same radio link and when allocated to the same radio link the windows are arranged to be adjacent in time.

8. A radio base station including the radio channel estimator claimed in claim 1.

9. A radio base station including the radio channel estimator claimed in claim 1 and arranged to dynamically control the number of windows allocated to the radio link in relation to the total traffic load and the number of available windows.

* * * * *